(12) United States Patent
Rohde et al.

(10) Patent No.: US 12,554,073 B2
(45) Date of Patent: Feb. 17, 2026

(54) MULTI-CAVITY OPTICAL CONNECTOR WITH CABLE MANAGEMENT

(71) Applicant: TE Connectivity Solutions GmbH, Schaffhausen (CH)

(72) Inventors: Douglas Harold Rohde, Hershey, PA (US); David James Fabian, Mt. Joy, PA (US)

(73) Assignee: TE Connectivity Solutions GmbH (CH)

( * ) Notice: Subject to any disclaimer, the term of this patent is extended or adjusted under 35 U.S.C. 154(b) by 268 days.

(21) Appl. No.: 18/071,278

(22) Filed: Nov. 29, 2022

(65) Prior Publication Data

US 2024/0176079 A1  May 30, 2024

(51) Int. Cl.
  *G02B 6/38* (2006.01)
  *G02B 6/40* (2006.01)
  *G02B 6/44* (2006.01)

(52) U.S. Cl.
  CPC .......... *G02B 6/387* (2013.01); *G02B 6/3878* (2013.01); *G02B 6/3885* (2013.01);
  (Continued)

(58) Field of Classification Search
  CPC .... G02B 6/3821; G02B 6/3869; G02B 6/387; G02B 6/3878; G02B 6/3885; G02B 6/3888; G02B 6/406; G02B 6/4471; G02B 6/3829; G02B 6/3855; G02B 6/3874; G02B 6/38875; G02B 6/3894; G02B 6/4407; G02B 6/4429; G02B 6/4434; G02B 6/4477; G02B 6/44765; G02B 6/4489; G02B 6/449; G02B 6/4491; G02B 6/3837; G02B 6/3825; G02B 6/4472; B29C 48/12; Y10T 428/2973
  See application file for complete search history.

(56) References Cited

U.S. PATENT DOCUMENTS

| 4,373,777 A | * | 2/1983 | Borsuk | ................ | G02B 6/3869 |
| | | | | | 385/139 |
| 4,516,829 A | * | 5/1985 | Borsuk | ................ | G02B 6/3869 |
| | | | | | 385/78 |

(Continued)

OTHER PUBLICATIONS

HET-A-02X, HET-A-04X and HET-A-05X for Hexashield Adapters, tyco Electronics, RPIP-696-00, p. 1-9, Sep. 2002 . (Year: 2002).*

(Continued)

*Primary Examiner* — Uyen N Le
*Assistant Examiner* — Darby M. Thomason

(57) ABSTRACT

A backshell the backshell comprising: a backshell housing configured to mechanically interengaged with a connector housing; a nest having a periphery and a plurality of cavities, each cavity of the plurality of cavities having an opening to the periphery and being configured to receive an eyelet of a cable, the nest being configured to restrict axial movement of the eyelet when disposed in the cavity; a capture member mechanically interengaged with the backshell to hold the nest in a fixed position relative to the backshell housing; and wherein the nest is disposed between the capture member and the backshell housing such that the opening of each cavity is blocked by at least one of the capture member or the backshell housing to hold each eyelet in one of the cavities.

18 Claims, 3 Drawing Sheets

(52) U.S. Cl.
CPC ........... *G02B 6/3888* (2021.05); *G02B 6/406* (2013.01); *G02B 6/4471* (2013.01); *G02B 6/3869* (2013.01)

(56) References Cited

U.S. PATENT DOCUMENTS

| | | | | |
|---|---|---|---|---|
| 5,048,918 | A | * | 9/1991 | Daems ................. G02B 6/3878 385/86 |
| 5,074,636 | A | * | 12/1991 | Hopper ................ G02B 6/4428 385/76 |
| 5,283,848 | A | * | 2/1994 | Abendschein ....... G02B 6/3878 385/71 |
| 5,870,515 | A | * | 2/1999 | Ott ....................... G02B 6/3879 385/59 |
| 5,923,802 | A | * | 7/1999 | Giebel ................. G02B 6/3823 385/59 |
| 6,398,423 | B1 | * | 6/2002 | Novacoski ........... G02B 6/3869 385/76 |
| 10,884,196 | B2 | * | 1/2021 | Lu ......................... G02B 6/406 |
| 11,226,464 | B2 | * | 1/2022 | Trnka .................... G02B 6/4477 |
| 2014/0004121 | A1 | | 1/2014 | Fanslow, III et al. |
| 2019/0154922 | A1 | | 5/2019 | Elenbaas et al. |
| 2021/0141169 | A1 | * | 5/2021 | Leeson ................ G02B 6/3898 |

OTHER PUBLICATIONS

HexaShield High-Performance EMC/EMI Adaptors, tyco Electronics, Catalog 1654507, p. 1-6, May 2003. (Year: 2003).*
HexaShield for Cylindrical Connectors Installation Procedure, tyco Electronics, RPIP-696-07, p. 1-4, Jul. 2003. (Year: 2003).*
Star, Multi-Position Hexashield-F EMI Termination System, TE Connectivity, Raychem Adapters, Feb. 2007. (Year: 2007).*
Amphenol Fiber Optic Interconnects, Amphenol Aerospace, p. 187, 195, 197, and 205-206, Oct. 2012. (Year: 2012).*
StarShieldTM Backshell General Information, Glenair, StarShieldTM Zero Length Shield Termination Catalog, Dec. 2012. (Year: 2012).*
Circular Backshells, TE connectivity, 1-1773922-5, May 2017. (Year: 2017).*
Raychem HexaShield EMC Adaptors, TE Connectivity, MIL-DTL-38999 Circular Connectors, p. 265-268. Jan. 2018. (Year: 2018).*
TE Connectivity, "Pro Beam Jr. Expanded Beam (EB) Cable Plug Connectors," Instruction Sheet, Jul. 16, 2019, 11 pages.
Extended European Search Report, App. No 23212881.9-1001 International Filing Date Jun. 3, 2024.

* cited by examiner

MULTI-CAVITY OPTICAL CONNECTOR WITH CABLE MANAGEMENT

FIELD OF INVENTION

The present invention relates, generally, to multi-cavity optical connectors, and, more specifically, to multi-cavity optical connectors with cable management features to prevent axial movement of the cable during use.

BACKGROUND OF INVENTION

Optical fiber connectors are a critical part of essentially all optical fiber communication systems. For instance, such connectors are used to join segments of fiber into longer lengths, to connect fiber to active devices, such as radiation sources, detectors and repeaters, and to connect fiber to passive devices, such as switches, multiplexers, and attenuators. The principal function of an optical fiber connector is to hold the fiber end such that the fiber's core is axially aligned with an optical pathway of the mating structure. This way, light from the fiber is optically coupled to the optical pathway.

Of particular interest herein, are multi-cavity connectors. Such connectors typically comprise a housing and an insert defining two or more cavities for holding ferrules. Over the years, multi-cavity connectors have evolved into ruggedized connector systems, comprising an outer housing which is configured to mate with the outer housing of a mating connector, typically through a screw connection. Numerous United States Military specifications describe such ruggedized connectors, including, for example, MIL-C-38999, MIL-C-5015, MIL-T-29504 and ARINC600 among others. Similar connectors have also become common in Europe, and include, for example, European modular rectangular connectors EN4644 and EN4165, which are commonly used for seat-to-seat electrical signal connections in commercial aircraft.

Although these multi-cavity connectors provide robust optical connections, Applicant recognizes that they lack cable management features to prevent axial movement of the cables as it exits the connector, nor are they compatible with standard fiber termination methods. Consequently, despite the robustness of the connector, the axial movement of the cables results in broken fibers and/or reduced performance of the connector assemblies. Therefore, Applicant recognizes the need to manage the cables as they exit the optical connector to prevent their axial movement. The present invention fulfills this need, among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Applicant has developed a backshell configuration for managing fiber optic cables to ensure that the cables exiting the connector are held in a fixed state to avoid stress-related damage or diminished performance.

In one embodiment, the present invention relates to an optical connector having a front and rear orientation and being configured for optically connecting a plurality of cables, each cable comprising one or more fibers terminated to a ferrule, each cable comprising a strength member and an eyelet crimped to the strength member, the connector comprising: (a) a connector housing; (b) a connector insert disposed in the connector housing and configured to receive a plurality of ferrules; and (c) a backshell, the backshell comprising at least the following, (i) a backshell housing configured to mechanically interengaged with the connector housing; (ii) a nest having a periphery and a plurality of cavities, each cavity of the plurality of cavities having an opening to the periphery and being configured to receive the eyelet of each cable, the nest being configured to restrict axial movement of the eyelet when disposed in the cavity; (iii) a capture member mechanically interengaged with the backshell to hold the nest in a fixed position relative to the backshell housing; and wherein the nest is disposed between the capture member and the backshell housing such that the opening of each cavity is blocked by at least one of the capture member or the backshell housing to hold each eyelet in one of the cavities.

In another embodiment, the present invention relates to a backshell for interengagement with an optical connector housing, the optical connector configured for optically connecting a plurality of cables, each cable comprising one or more fibers terminated in a ferrule, each cable comprising a strength member and an eyelet crimped to the strength member, the connector comprising a connector housing and a connector insert disposed in the connector housing and configured to receive a plurality of ferrules, the backshell comprising: (a) a backshell housing configured to mechanically interengaged with the connector housing; (b) a nest having a periphery and a plurality of cavities, each cavity of the plurality of cavities having an opening to the periphery and being configured to receive the eyelet of each cable, the nest being configured to restrict axial movement of the eyelet when disposed in the cavity; (c) a capture member mechanically interengaged with the backshell to hold the nest in a fixed position relative to the backshell housing; and wherein the nest is disposed between the capture member and the backshell housing such that the opening of each cavity is blocked by at least one of the capture member or the backshell housing to hold each eyelet in one of the cavities.

In yet another embodiment, the present invention relates to a method of assembling a plurality of cables in a connector, each cable comprising a one or more fibers terminated to a ferrule, each cable comprising a strength member and an eyelet crimped to the strength member, the method comprising: (a) inserting the ferrule of each cable in a connector insert; (b) radially inserting the crimp eyelet of each cable in a cavity of the nest through an opening on the periphery of the nest; (c) while the crimp eyelets are disposed in the cavities of the nest, sliding the capture member over the nest thereby encircling the periphery of nest and blocking the peripheral openings, thereby closing the crimp eyelets in the cavities; and (d) connecting the capture member to the backshell housing such that the nest is sandwiched between the capture member and the backshell housing, thereby preventing its axial movement.

DETAILED DESCRIPTION

Figure 1:
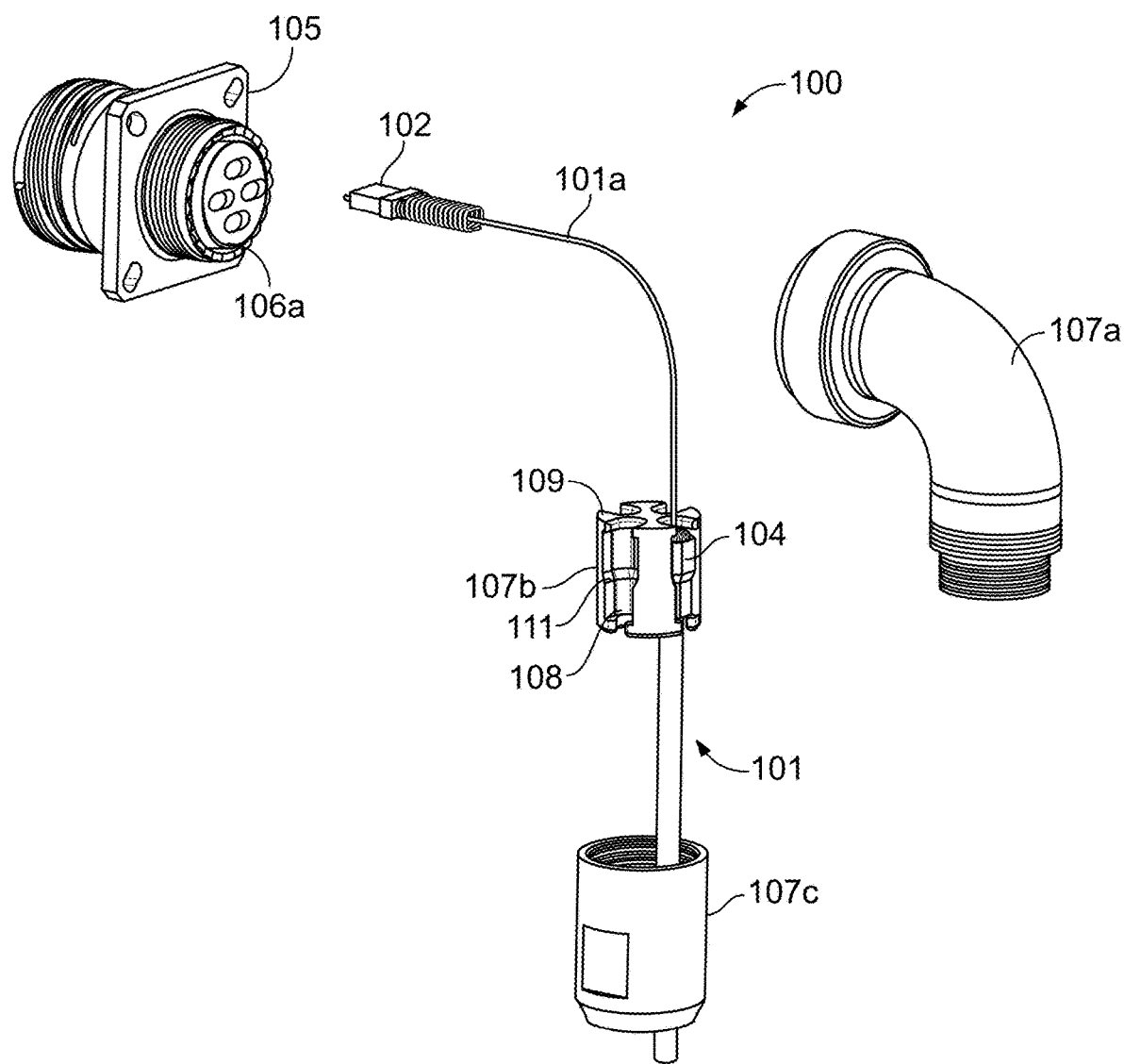
FIG. 1 shows an exploded view of the of one embodiment of the connector of the present invention.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Referring to FIGS. 1-4, one embodiment of an optical connector 100 of the present invention is shown. The optical connector has a front and rear orientation, and is configured for optically connecting a plurality of cables (one cable 101 is shown in FIGS. 1-4). Each cable 101 comprises one or more fibers, which are terminated to a ferrule 102. Each cable also comprises a strength member 103 and an eyelet 104 crimped to the strength member.

In one embodiment, the connector comprises a connector housing 105 and a connector insert 106 disposed in the connector housing and configured to receive a plurality of ferrules, and a backshell 107. The backshell comprises a backshell housing 107a configured to mechanically interengaged with the connector housing, a nest 107b, and a capture member 107c mechanically interengaged with the backshell housing to hold the nest in a fixed position relative to the backshell housing.

The nest has a periphery 109 and defines a plurality of cavities 108. For each cavity of the plurality of cavities, the nest defines an opening 110 at the periphery configured to receive the eyelet of a cable, a front shoulder 300, and a restriction 111. An eyelet of a cable is disposed in a cavity between the front shoulder and the restriction to restrict axial movement of the eyelet in the cavity. The nest is disposed between the capture member and the backshell housing such that the opening of each cavity is blocked by at least one of the capture member or the backshell housing to hold each eyelet in one of the cavities. In the embodiment shown in FIGS. 1-4, the capture member receives the nest and blocks the opening of each cavity. These features are described below in greater detail along with selected alternative embodiments.

The connector housing 105 and insert 106 are well-known and conventional components and will not be described in detail herein. In this embodiment, the connector is a MIL D38999 circular connector, having a 4-cavity insert 106 and a Polamco® Swept Elbow backshell 107. (A Polamco is a brand of a swept elbow which is a type of angled backshell—usually 45° or 90°—that attaches to a circular connector to route cables away in a smooth, controlled bend.) It should be understood, however, that the backshell configuration of the present invention can be used with any multi-cavity connector. Additionally, although a circular connector is depicted herein, the connector need not be circular and may be, instead, rectangular. Likewise, the backshell configuration is not limited to an elbow, but can be configured in any shape, including straight and angled. Additionally, the backshell configuration is not limited in size and can be scaled up or down for any size connector—e.g., 11, 13, and 15 D38999 connectors. Likewise, although a circular insert having rectangular cavities to accommodate MT ferrules is shown, other embodiments are within the scope of the invention. For example, rather than MT ferrules, the insert may be configured to receive circular ferrules, which may be multifiber or single-fiber ferrules. Likewise, although an insert having four cavities is shown, an insert having fewer than four cavities or greater than four cavities may be used.

The cable 101, including its optical fibers, strength member 103 and ferrule 102, is also well known and will not be described in detail herein. The cable 101 as shown is a conventional 4-24 fiber cable terminated with an MT ferrule, although any fiber-count cable, including a single fiber cable, may be used and terminated with any known ferrule.

Figure 4:
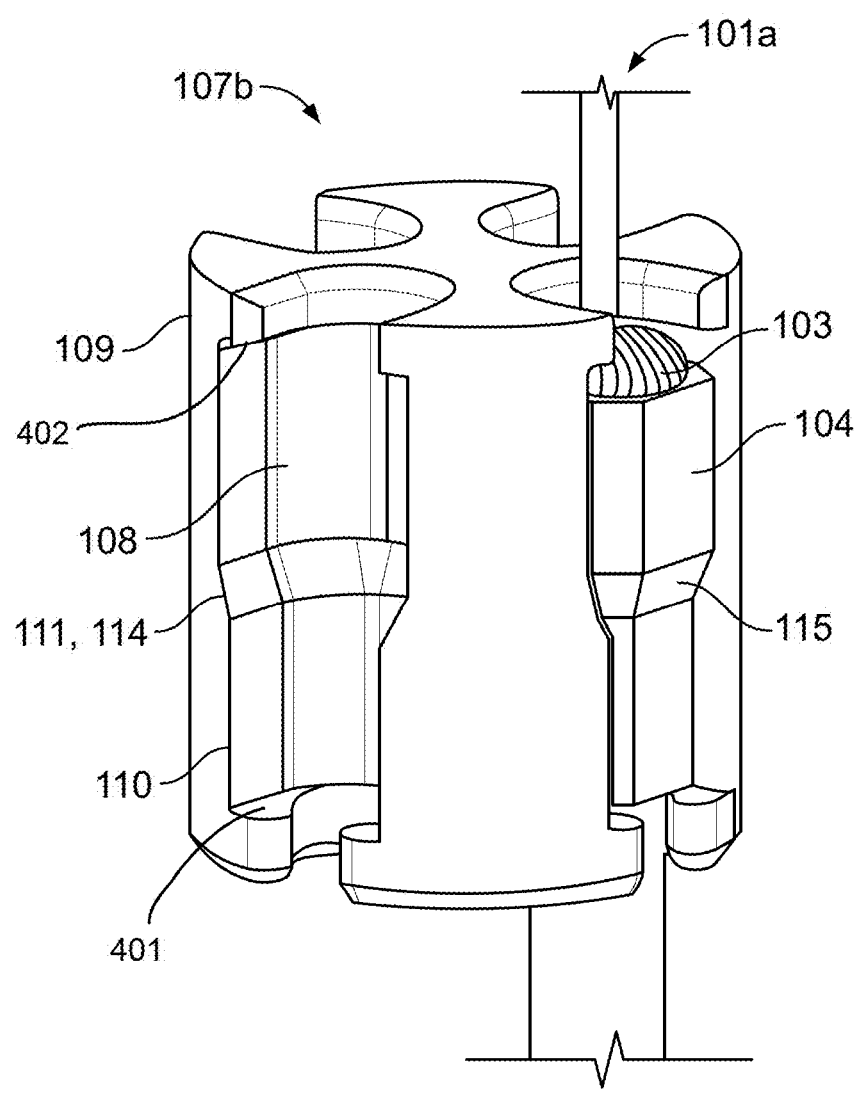
FIG. 4 shows a close-up view of the nest of the embodiment of FIG. 1.

The nest functions to secure the crimp eyelet, and thereby prevents movement of the bare fiber 101a from the back of the connector housing 105 to the nest 107b. As described above by restricting this movement, damage to the cable 101 is prevented. The nest secures the crimp eyelet by holding it within the cavity and preventing its axial movement through a restriction 111 which prevents the crimp eyelet from passing through. In one embodiment, the restriction is a narrowed portion 114 of the nest cavity that prevents a crimp shoulder 115 from passing through as shown in FIG. 4. Additionally, in this embodiment, each cavity of the nest 107b has a front shoulder 402 and a rear shoulder 401 at either end to receive and hold the eyelet in place within the nest 107b. Other mechanisms for restricting movement of the crimp eyelet within the nest include, for example, a clip or other fastener for holding the eyelet to the nest, a compression fit of the eyelet within the cavity, adhesive between the eyelet and the nest, and a magnetic attraction between the nest and the eyelet, just to name a few.

The crimp eyelet is received in the cavity through an opening 110 at the perimeter 109 of the nest 107b as shown in FIG. 4. The openings along the perimeter of the nest facilitate easy radial insertion of the crimp eyelets in the cavities. In this particular embodiment, the nest is configured with four cavities to accommodate four crimp eyelets (and thus four cables). It should be understood, however, that other embodiments are possible and that fewer than four cavities or greater than four cavities may be defined in the nest.

Figure 3:
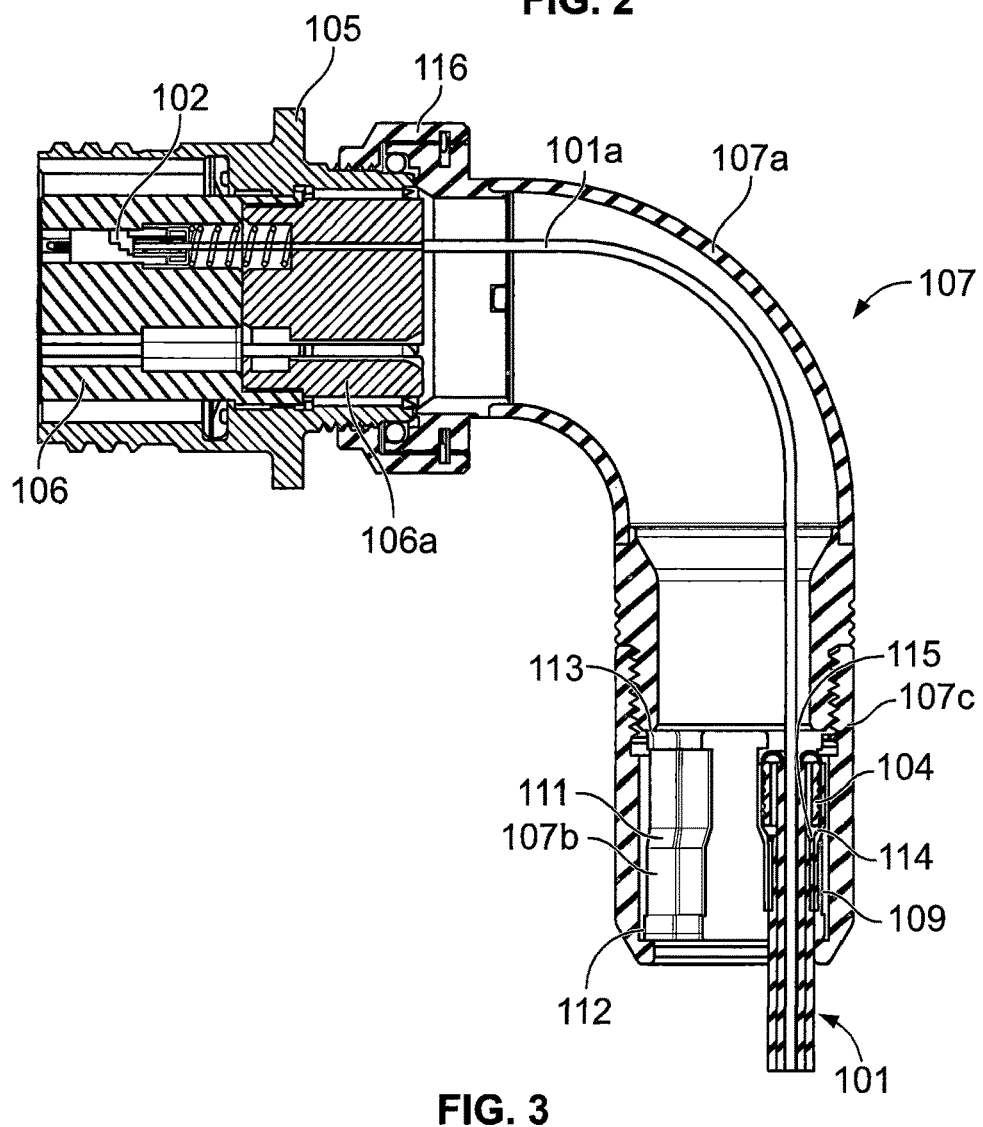
FIG. 3 shows a cross-sectional view of the connector of the embodiment of FIG. 1.

In one embodiment, the backshell comprises a capture member 107c for securing the nest. In one embodiment, the capture member 107c has two functions. First, it functions to hold the crimp eyelets within the cavities. In one embodiment, the capture member 107c is configured to receive the nest such that it can be slid over the nest once the crimp eyelets are in place to block the openings of the nest. As shown in FIG. 3, once the capture member 107c is slid over the nest 107b such that the nest is disposed within the capture member 107c, the openings around the perimeter of the nest are essentially closed/blocked, thereby securing the crimp eyelets within the cavities of the nest.

The capture member 107c also functions to prevent the axial movement of the nest. In one embodiment, the nest is sandwiched between the capture member and the backshell housing. More specifically, in one embodiment, the backshell housing comprises an inner shoulder 113 against which the nest abuts when the capture member is connected to the backshell housing as shown in FIG. 3, thereby preventing the nest's forward axial movement (i.e., movement of the nest toward the connector insert). In this embodiment, the capture member comprises an outer shoulder 112 against which the nest abuts as shown in FIG. 3, thereby preventing the nest's rearward movement (i.e., movement of the nest away from the connector insert).

In one embodiment, the capture member 107c threadably engages with threads on the rear portion of the backshell housing 107a as shown in FIG. 3, although other means for connecting the capture member to the backshell housing exist—e.g., a snaping mechanism such as a resilient tab being received in an aperture or a resilient collet snaping over a ridge. Still other means of attachment will be obvious to those of skill in the art in light of this disclosure.

As is known, in one embodiment, nut 116 is used to secure the backshell housing 107a to the rear of the connector housing 105 as shown in FIG. 3. In this embodiment, nut 116 threadably engages with the rear of connector housing 105.

Once the connector assembly 100 is assembled as shown in FIG. 3, the nest 107b prevents movement of the stripped or bare fiber 101a between the rear of the connector housing 105 and the nest 107b. Specifically, because the nest prevents the axial movement of the crimp eyelet, and the crimp eyelet is secured to the strength member 103, any tension on the cable 101 exiting the connector assembly 100 is borne by the nest 107b, and transferred to the backshell housing. Thus, no tension is transferred from the strength member 103 of the cable 101 to the bare fiber 101a.

Figure 2:
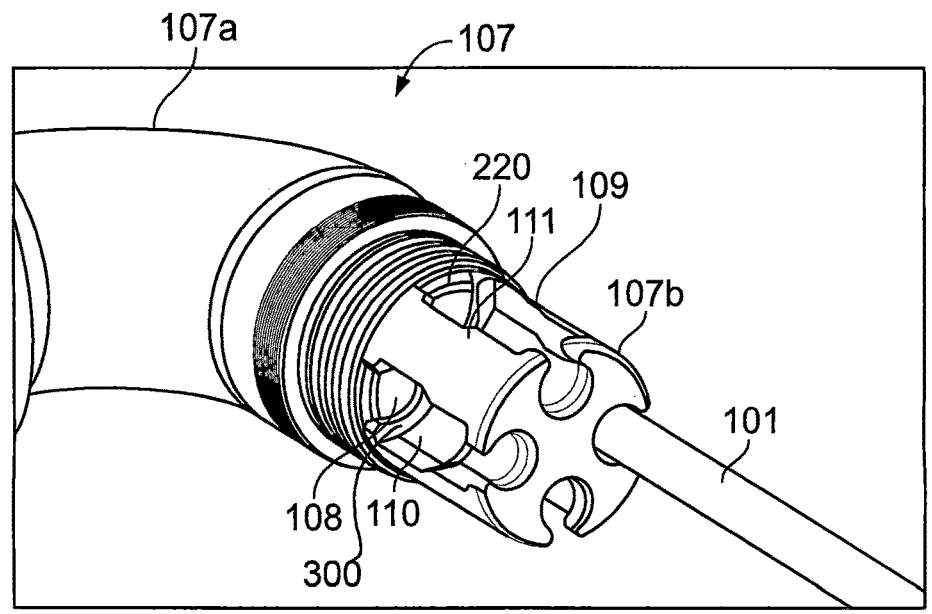
FIG. 2 shows a close-up view of the nest adjacent the backshell housing.

In one embodiment, as shown in FIG. 2, the backshell housing 107a comprises keys 220 configured to slot into one or more cavities of the nest 107b to prevent rotation of the nest relative to the backshell housing 107a as the capture member is tightened onto the backshell housing 107a.

As mentioned above, the unique configuration of the nest and the capture member provide an unprecedented ease of assembly of the connector assembly. In one embodiment, the method of assembly comprises: (a) inserting the ferrule 102 of each cable 101 in a connector insert 106; (b) radially inserting the crimp eyelet 104 of each cable in a cavity 108 of the nest 107b through an opening 110 on the periphery 109 of the nest 107b; (c) while the crimp eyelets are disposed in the cavities of the nest, sliding the capture member 107c over the nest thereby encircling the periphery 109 of nest and blocking the peripheral openings 110, thereby closing the crimp eyelets in the cavities; and (d) connecting the capture member 107c to the backshell housing 107a such that the nest is sandwiched between the capture member and the backshell housing, thereby preventing its axial movement.

In one embodiment, prior to step (a): the method comprises (i) stripping the cables to expose the bare fiber(s) 101a; (ii) terminating the fiber(s) of each cable with a ferrule 102; (iii) crimping eyelets onto the strength member 103 of the cable at the point where the fibers are stripped from the cable, and (iv) feeding the bare fiber(s) terminated with a ferrule through the backshell housing. In one embodiment, the cable comprises a plurality of fibers, and a ribbon is formed from stripped bare fibers to facilitate control and handling.

In one embodiment, prior to step (b): the method comprises (i) loading the ferrules into the connector insert 106 and installing a retainer 106a; and (ii) positioning the backshell housing behind the connector housing and securing it thereto using a threaded nut 116 as shown in FIG. 3.

These and other advantages may be realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

What is claimed is:

1. An optical connector having a front and rear orientation and being configured for optically connecting a plurality of cables, each cable comprising one or more fibers terminated to a ferrule, each cable comprising a strength member and an eyelet crimped to said strength member, said connector comprising:
  a connector housing;
  a connector insert disposed in said connector housing and configured to receive a plurality of ferrules;
  a backshell, said backshell comprising at least the following:
  a backshell housing configured to mechanically interengage with said connector housing;
  a nest having a periphery and a plurality of cavities, each cavity of said plurality of cavities having an opening to said periphery and being configured to receive said eyelet of each cable, said nest defining a front shoulder and a restriction for each cavity that restrict axial movement of said eyelet when disposed in said cavity;
  a capture member mechanically interengaged with said backshell housing to hold said nest in a fixed position relative to said backshell housing; and
  wherein said nest is disposed between said capture member and said backshell housing such that said opening of each cavity is blocked by at least one of said capture member or said backshell housing to hold each eyelet in one of said cavities.

2. The optical connector of claim 1, wherein said capture member receives said nest and blocks said opening of each cavity.

3. The optical connector of claim 1, wherein said backshell housing comprises an inner shoulder against which said nest abuts thereby preventing its forward axial movement, and wherein said capture member comprises an outer shoulder against which said nest abuts thereby preventing its rearward movement.

4. The optical connector of claim 1, wherein said restriction is a narrowed portion that prevents said eyelet from passing through.

5. The optical connector of claim 1, wherein said ferrule is an MT ferrule.

6. The optical connector of claim 1, wherein said plurality of cables comprises four cables.

7. The optical connector of claim 1, wherein each cable comprises a plurality of fibers.

8. The optical connector of claim 1, wherein said capture member is in threaded engagement with said backshell.

9. The optical connector of claim 1, wherein said backshell further comprises a nut for threadedly engaging said connector housing.

10. A backshell for interengagement with an optical connector housing, the optical connector housing configured for optically connecting a plurality of cables, each cable comprising one or more fibers terminated in a ferrule, each cable comprising a strength member and an eyelet crimped to the strength member, the connector comprising a connector housing and a connector insert disposed in the connector housing and configured to receive a plurality of ferrules, the backshell comprising:
  a backshell housing configured to mechanically interengage with said connector housing;
  a nest having a periphery and a plurality of cavities, each cavity of said plurality of cavities having an opening to said periphery and being configured to receive said eyelet of each cable, said nest defining a front shoulder and a restriction for each cavity that restrict axial movement of said eyelet when disposed in said cavity;

a capture member mechanically interengaged with said backshell to hold said nest in a fixed position relative to said backshell housing; and wherein said nest is disposed between said capture member and said backshell housing such that said opening of each cavity is blocked by at least one of said capture member or said backshell housing to hold each eyelet in one of said cavities.

11. The backshell of claim 10, wherein said capture member receives said nest and blocks said opening of each cavity.

12. The backshell of claim 10, wherein said backshell housing comprises an inner shoulder against which said nest abuts thereby preventing its forward axial movement, and wherein said capture member comprises an outer shoulder against which said nest abuts thereby preventing its rearward movement.

13. The backshell of claim 10, wherein said restriction is a narrowed portion that prevents said eyelet from passing through.

14. The backshell of claim 10, wherein the backshell is configured to interengage with said optical connector, wherein the ferrule of said optical connector is an MT ferrule.

15. The backshell of claim 10, wherein the backshell is configured to interengage with said optical connector, wherein each cable comprises a plurality of fibers.

16. A method of assembling a plurality of cables in a connector, each cable comprising one or more fibers terminated to a ferrule, each cable comprising a strength member and an eyelet crimped to the strength member, the method comprising:

(a) inserting the ferrule of each cable in a connector insert;

(b) radially inserting the crimp eyelet of each cable in a cavity of the nest through an opening on the periphery of a nest such that said crimp eyelet is disposed between a front shoulder and a restriction of the nest;

(b) radially inserting the crimp eyelet of each cable in a cavity of the nest through an opening on the periphery of a nest such that said crimp eyelet is disposed between a front shoulder and a restriction of the nest to restrict axial movement of said eyelet in said cavity;

(c) while the crimp eyelets are disposed in the cavities of the nest such that, sliding a capture member over the nest thereby encircling the periphery of the nest and blocking the peripheral openings, thereby closing the crimp eyelets in the cavities; and (d) connecting the capture member to a backshell housing such that the nest is sandwiched between the capture member and the backshell housing, thereby preventing its axial movement.

17. The method of claim 16, further comprising prior to step (a):

(i) stripping the cables to expose the bare fiber(s);
(ii) terminating the fiber(s) of each cable with a ferrule;
(iii) crimping eyelets onto the strength member of the cable at the point where the fibers are stripped from the cable, and
(iv) feeding the bare fiber(s) terminated with a ferrule through the backshell housing.

18. The method of claim 16, further comprising prior to step (b) and after step (a):

(i) installing a retainer; and
(ii) positioning the backshell housing behind the connector housing and securing it thereto using a threaded nut.

* * * * *